(12) United States Patent
Ahmed

(10) Patent No.: US 10,823,579 B2
(45) Date of Patent: Nov. 3, 2020

(54) METHOD AND APPARATUS FOR PARAMETER ASSISTED MAP ITEM DISPLAY

(71) Applicant: FORD GLOBAL TECHNOLOGIES, LLC, Dearborn, MI (US)

(72) Inventor: Hanan Ahmed, Belleville, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 400 days.

(21) Appl. No.: 15/910,768

(22) Filed: Mar. 2, 2018

(65) Prior Publication Data
US 2019/0271560 A1 Sep. 5, 2019

(51) Int. Cl.
| G01C 21/36 | (2006.01) |
| H04L 29/08 | (2006.01) |
| G06Q 30/02 | (2012.01) |
| H04W 4/80 | (2018.01) |

(52) U.S. Cl.
CPC ..... *G01C 21/3682* (2013.01); *G01C 21/3676* (2013.01); *G06Q 30/0259* (2013.01); *H04L 67/306* (2013.01); *H04W 4/80* (2018.02)

(58) Field of Classification Search
CPC ...... B60W 30/09; B60W 10/04; B60W 10/20; B62D 15/0265; G05D 1/0214; G05D 1/0223; G05D 1/0238; G06K 9/00798; G06K 9/00805
See application file for complete search history.

(56) References Cited

U.S. PATENT DOCUMENTS

| 9,451,020 | B2 | 9/2016 | Liu et al. | |
| 9,621,937 | B1 | 4/2017 | Carter | |
| 2005/0171686 | A1* | 8/2005 | Davis | G01C 21/3679 701/532 |
| 2005/0216190 | A1* | 9/2005 | Obata | G01C 21/3415 701/442 |
| 2008/0139181 | A1* | 6/2008 | Lokshin | H04W 4/024 455/414.1 |
| 2010/0114469 | A1* | 5/2010 | Chao | G01C 21/3484 701/532 |
| 2011/0040626 | A1* | 2/2011 | Lin | G06Q 30/02 705/14.63 |
| 2012/0054035 | A1* | 3/2012 | Nam | G06Q 10/047 705/14.58 |
| 2013/0138343 | A1* | 5/2013 | Choi | G01C 21/3679 701/527 |
| 2013/0197973 | A1* | 8/2013 | Liu | G06Q 30/02 705/7.32 |
| 2013/0245944 | A1* | 9/2013 | Rutten | G01C 21/36 701/533 |
| 2013/0339076 | A1* | 12/2013 | Baranda | G06Q 10/047 705/7.17 |

(Continued)

*Primary Examiner* — Calvin Cheung
(74) *Attorney, Agent, or Firm* — Michael Spenner; Brooks Kushman P.C.

(57) ABSTRACT

A system includes a processor configured to load predefined point of interest (POI) parameters, defining when a POI should be displayed and associated with the POI, from a user profile associated with a known vehicle occupant. The processor is also configured to examine an upcoming navigation route and populate a navigation route display with POIs identified by the parameters, based on the parameters associated with a given POI being met by a present set of conditions.

18 Claims, 4 Drawing Sheets

(56) References Cited

U.S. PATENT DOCUMENTS

| | | | |
|---|---|---|---|
| 2014/0039792 A1* | 2/2014 | Seetharam | G01C 21/3679 |
| | | | 701/538 |
| 2015/0006289 A1* | 1/2015 | Jakobson | G06Q 30/0256 |
| | | | 705/14.54 |
| 2015/0198453 A1* | 7/2015 | Baid | G06Q 30/0261 |
| | | | 705/14.55 |
| 2015/0220991 A1 | 8/2015 | Butts et al. | |
| 2015/0317649 A1* | 11/2015 | Joshi | G06Q 30/0207 |
| | | | 705/7.32 |
| 2015/0362325 A1* | 12/2015 | Shin | G06F 16/23 |
| | | | 701/532 |
| 2016/0069699 A1* | 3/2016 | Chen | G01C 21/3682 |
| | | | 701/426 |
| 2016/0273935 A1* | 9/2016 | Oda | G01C 21/36 |
| 2016/0343032 A1 | 11/2016 | Dewitt et al. | |
| 2017/0318425 A1* | 11/2017 | Dai | H04W 4/021 |
| 2019/0213183 A1* | 7/2019 | Shin | G01C 21/32 |

* cited by examiner

METHOD AND APPARATUS FOR PARAMETER ASSISTED MAP ITEM DISPLAY

TECHNICAL FIELD

The illustrative embodiments generally relate to methods and apparatuses for parameter assisted map item display.

BACKGROUND

Original equipment manufacturers (OEMs) have begun to equip many new vehicles on the market with built in navigation systems, embedded cellular connectivity, Wi-Fi, Bluetooth and NFC technologies. These technologies are included in addition to brought-in devices that support multiple wireless technologies, and which are often brought into the vehicle for a short or extended time. This availability of connectivity allows for accurate location determination and two-way communication to/from the vehicle to other vehicles, infrastructure, the cloud and the internet. Each of these technologies may offer different ranges, bandwidths, levels of reliability and security which may facilitate different applications and services on the vehicle.

Advertisers, wireless service providers, cloud services and vendors are eager to reach this mass market while the auto industry is concerned about safety and privacy impacts. Existing systems are capable of receiving input related to certain types of points of interest (POIs) and displaying instances of those POIs on a map display.

SUMMARY

In a first illustrative embodiment, a system includes a processor configured to load predefined point of interest (POI) parameters, defining when a POI should be displayed and associated with the POI, from a user profile associated with a known vehicle occupant. The processor is also configured to examine an upcoming navigation route and populate a navigation route display with POIs identified by the parameters, based on the parameters associated with a given POI being met by a present set of conditions.

In a second illustrative embodiment, a computer-implemented method includes automatically displaying a plurality of points of interest (POIs) along an input route, the POIs being within predefined proximities, pre-associated with the POIS, to a vehicle location, wherein at least one POI has a plurality of distances associated therewith, wherein different ones of the plurality of distances have differing discounts associated therewith, and wherein a relevant distance, used as a basis for displaying the at least one POI, is chosen responsive to identification of a discount offered at the POI.

In a third illustrative embodiment, a computer-implemented method includes accessing a set of point of interest (POI) parameters associated with an identified vehicle occupant. The method also includes determining a correlation between a parameter set, associated with a type of POI, and a current condition set, based on predefined parameter values. The method further includes displaying a plurality of the POIs of the type, in conjunction with a displayed route, responsive to the correlation. Also, the method includes determining that a predefined event indicating a stop at one of the POIs of the type has occurred and removing the plurality of POIs when the condition set no longer correlates to the predefined parameter values.

DETAILED DESCRIPTION

As required, detailed embodiments are disclosed herein; however, it is to be understood that the disclosed embodiments are merely illustrative and may be incorporated in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the claimed subject matter.

Figure 1:
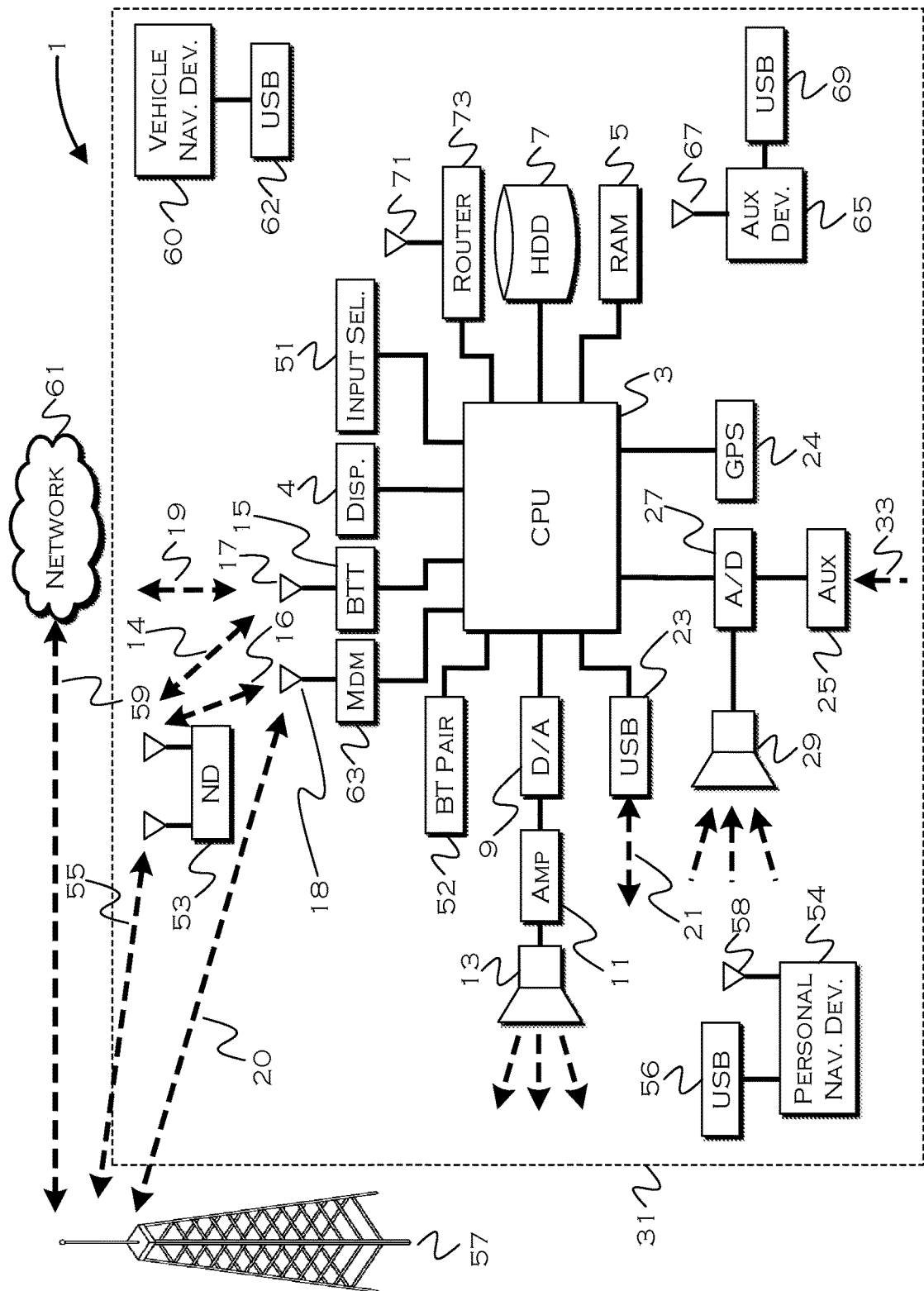
FIG. 1 shows an illustrative vehicle computing system.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touchscreen display. In another illustrative embodiment, the interaction occurs through button presses, spoken dialog system with automatic speech recognition, and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory. In general, persistent (non-transitory) memory can include all forms of memory that maintain data when a computer or other device is powered down. These include, but are not limited to, HDDs, CDs, DVDs, magnetic tapes, solid state drives, portable USB drives and any other suitable form of persistent memory.

The processor is also provided with a number of different inputs allowing the user to interface with the processor. In this illustrative embodiment, a microphone 29, an auxiliary input 25 (for input 33), a USB input 23, a GPS input 24, screen 4, which may be a touchscreen display, and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be transmitted to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device (hereafter referred to as ND) 53 can then be used to communicate 59 with a network 61 outside the vehicle 31 through, for example, communication 55 with a cellular tower 57. In some embodiments, tower 57 may be a Wi-Fi access point.

Exemplary communication between the ND 53 and the BLUETOOTH transceiver 15 is represented by signal 14.

Pairing the ND 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with ND 53. Alternatively, it may be desirable to include an onboard modem 63 having antenna 18 in order to communicate 16 data between CPU 3 and network 61 over the voice band. The ND 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device). Bluetooth is a subset of the IEEE 802 PAN (personal area network) protocols. IEEE 802 LAN (local area network) protocols include Wi-Fi and have considerable cross-functionality with IEEE 802 PAN. Both are suitable for wireless communication within a vehicle. Another communication means that can be used in this realm is free-space optical communication (such as IrDA) and non-standardized consumer IR protocols.

In another embodiment, the ND 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example). While frequency division multiplexing may be common for analog cellular communication between the vehicle and the internet, and is still used, it has been largely replaced by hybrids of Code Domain Multiple Access (CDMA), Time Domain Multiple Access (TDMA), Space-Domain Multiple Access (SDMA) for digital cellular communication. If the user has a data-plan associated with the nomadic device, it is possible that the data-plan allows for broadband transmission and the system could use a much wider bandwidth (speeding up data transfer). In yet another embodiment, the ND 53 is replaced with a cellular communication device (not shown) that is installed to vehicle 31. In still another embodiment, the ND 53 may be a wireless local area network (LAN) device capable of communication over, for example (and without limitation), an 802.11g network (i.e., Wi-Fi) or a Wi-Max network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58, a vehicle navigation device 60 having a USB 62 or other connection, an onboard GPS device 24, or remote navigation system (not shown) having connectivity to network 61. USB is one of a class of serial networking protocols. IEEE 1394 (FireWire™ (Apple), i.LINK™ (Sony), and Lynx™ (Texas Instruments)), EIA (Electronics Industry Association) serial protocols, IEEE 1284 (Centronics Port), S/PDIF (Sony/Philips Digital Interconnect Format) and USB-IF (USB Implementers Forum) form the backbone of the device-device serial standards. Most of the protocols can be implemented for either electrical or optical communication.

Further, the CPU could be in communication with a variety of other auxiliary devices 65. These devices can be connected through a wireless 67 or wired 69 connection. Auxiliary device 65 may include, but are not limited to, personal media players, wireless health devices, portable computers, and the like.

Also, or alternatively, the CPU could be connected to a vehicle based wireless router 73, using for example a Wi-Fi (IEEE 803.11) 71 transceiver. This could allow the CPU to connect to remote networks in range of the local router 73.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While many navigation systems are capable of identifying a destination or waypoint based on specified user input, the systems often lack an ability to dynamically adapt a navigation display to reflect a more generalized set of user preferences. The illustrative embodiments allow users to predefined preferences, and parameterize those preferences, so that a vehicle or cloud server can dynamically update a map with relevant POIs along any journey.

These parameters can be time-based, day of week based, location based, weather based, etc. The parameters may also be adaptive, so that places recently visited by a user may be eschewed or ignored until a relevance parameter is again met. For example, if a user typically drinks coffee Monday through Friday, the system may show all coffee stops (or a preferred vendor) along a given route, but once the user has stopped at one such location, the process may remove the remaining coffee POIs until the following day (when the relevance parameter resets). This provides a user with a relevant, informative map display, capable of self-regulation (decluttering, for example) and adaptive to states and parameters that shift with travel.

The user preferences can be stored on a server as well as on a vehicle, and associated with a user profile. Thus, if the user is traveling and using a rental car, then the preceding coffee parameters might show the user coffee in a remote location (wherever the user is away from home), allowing the user to replicate daily routines without having to interact with an alternative form of navigation system which might otherwise be confusing or off-putting.

Figure 2:
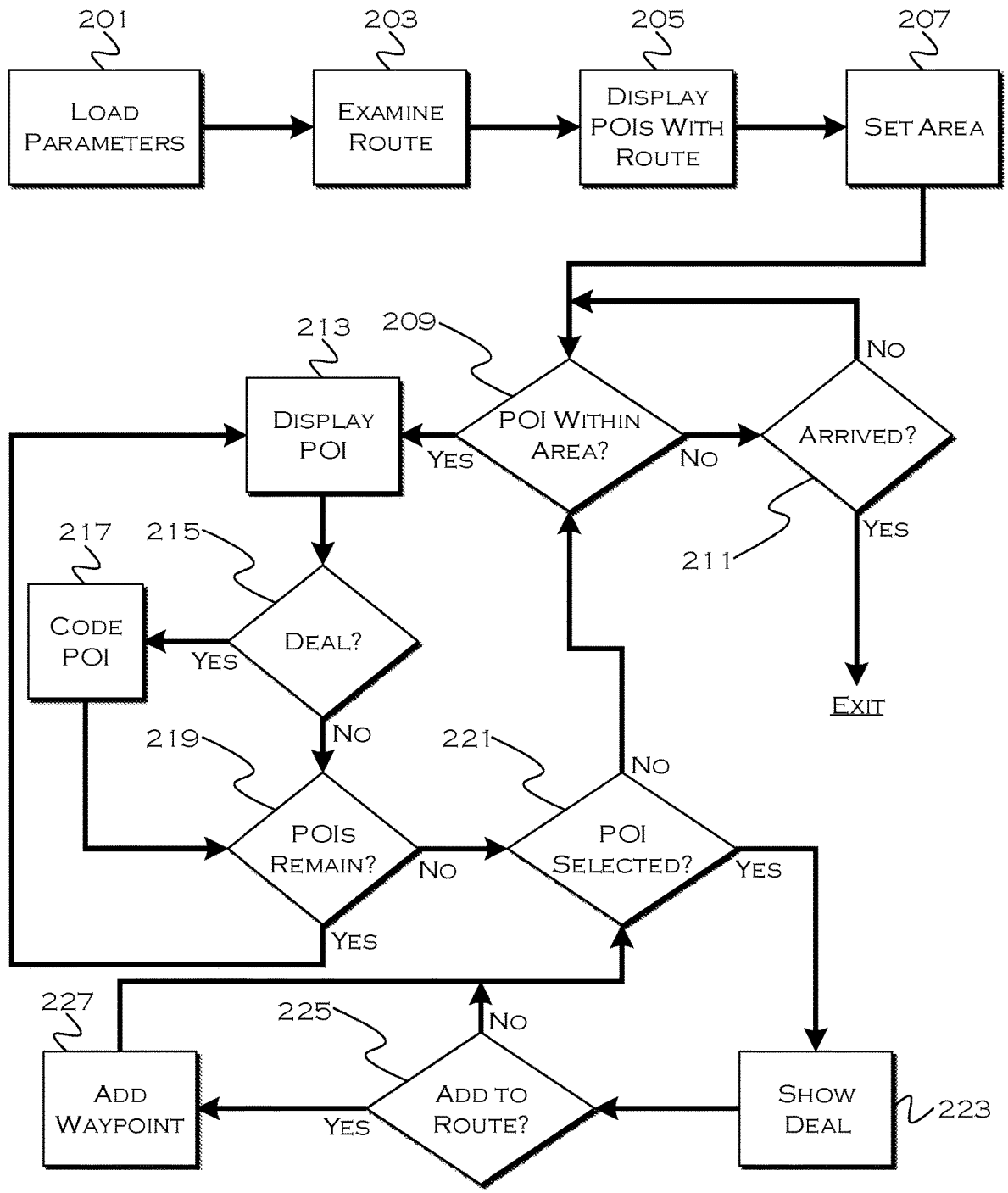
FIG. 2 shows an illustrative process for handling predefined POI preferences.

FIG. 2 shows an illustrative process for handling predefined POI preferences. In this illustrative example, a navigation system or remote system may identify a user through the presence of a user-affiliated device, through facial or voice recognition, through input of a user code or in any other suitable manner. The process then loads 201 the parameters associated with the identified user.

So, for example, a user profile could indicate that once a week the process should display grocery stores after 5 PM, because the user likes to shop on the way home from work. The user can also set when the relevance resets, for example, each Sunday. Then, each day the user is driving after 5 PM, all grocery stores (or grocery stores of a certain brand or type) may be shown along a given route. The user may also not like shopping after 8 PM, so the display may remove the stores after 8 PM. Once the user has stopped for groceries that week, the process would wait until Sunday to display the grocery stores again for the next week. In this manner, the system can display interesting POIs, but also avoid an overcluttered display of POIs that are not presently relevant to the user.

After the parameters have been loaded and the route has been examined, the process may display 205 all POIs associated with that particular route in a large-form navigation display, which may give a user a sense of how many options exist along a whole route. This could be a zoomed-out map display showing the entire route, along with POI identifiers along the way. If the environment is safe (e.g., the vehicle is not moving), the user may be able to select a given POI and add the POI as a waypoint, or to view more information about the selected POI. In one example, the POIs may be color coded, such that POIs presenting deal or sale opportunities may be visually identifiable, in case the user wants to visit the POI for the special deal.

After the initial route display, if desired, the process can then set 207 a viewing area, which can define a region around a vehicle (e.g., a circle or other distance from a vehicle). The area may be centered on the vehicle or may be set to look in certain directions. The user can customize the area based on distance or travel time, so that different users, who are willing to travel different distances, can have different defined areas of deviation. The areas may even vary by POI, so the user will go only 1 mile off route to get gas, but may be willing to go up to 4 miles off route to find a particular brand of coffee or restaurant.

For either a single or multiple areas, the process determines 209 of there are any relevant POIs within the area (proximate to the vehicle) based on current vehicle location. Again, a first and second POI may be displayed based on different proximities associated with the respective POIs.

If a given POI is within a distance associated with the POI, the process displays 213 an indicator for the POI. Depending on a number of factors, this could be an icon, a name, etc. Also, in this example, the process may determine 215 if there is a deal associated with the POI. For example, a user may be in the market for a new vehicle, but may only want to stop if there is an offer corresponding to a favorable discount or lease rate. In this example, the process may not display the POI unless such an offer is present. Also, in this example, the process may color or otherwise visually code 217 the POI so that the user can make a swift visual identification of the POI as having a deal associated therewith. This process repeats until no POIS remain 219.

In this example, the driver can also select a POI for additional information, or to add the POI as a waypoint. The vehicle may disable POI selection under certain conditions (e.g., driving at certain speeds), and the driver may have to wait until the vehicle slows or stops to select a POI. In other examples, the driver may be able to verbally select a POI under different conditions.

Once a POI is selected 221, the process may show 223 additional information about the POI. This can include, for example, a deal associated with the POI, merchant information and/or an option to add the POI as a waypoint along a route. If the driver elects to add 225 the POI as a waypoint, the system will reroute 227 to a route including the waypoint, and the driver can repeat this process for as many displayed POIs as desired. In at least one example, the display may dynamically react to selection, in the sense that the system may remove other POIs of the same brand or type (sharing certain characteristics) once the driver has selected one of the POIs as a waypoint, in order to declutter the display.

Figure 3:
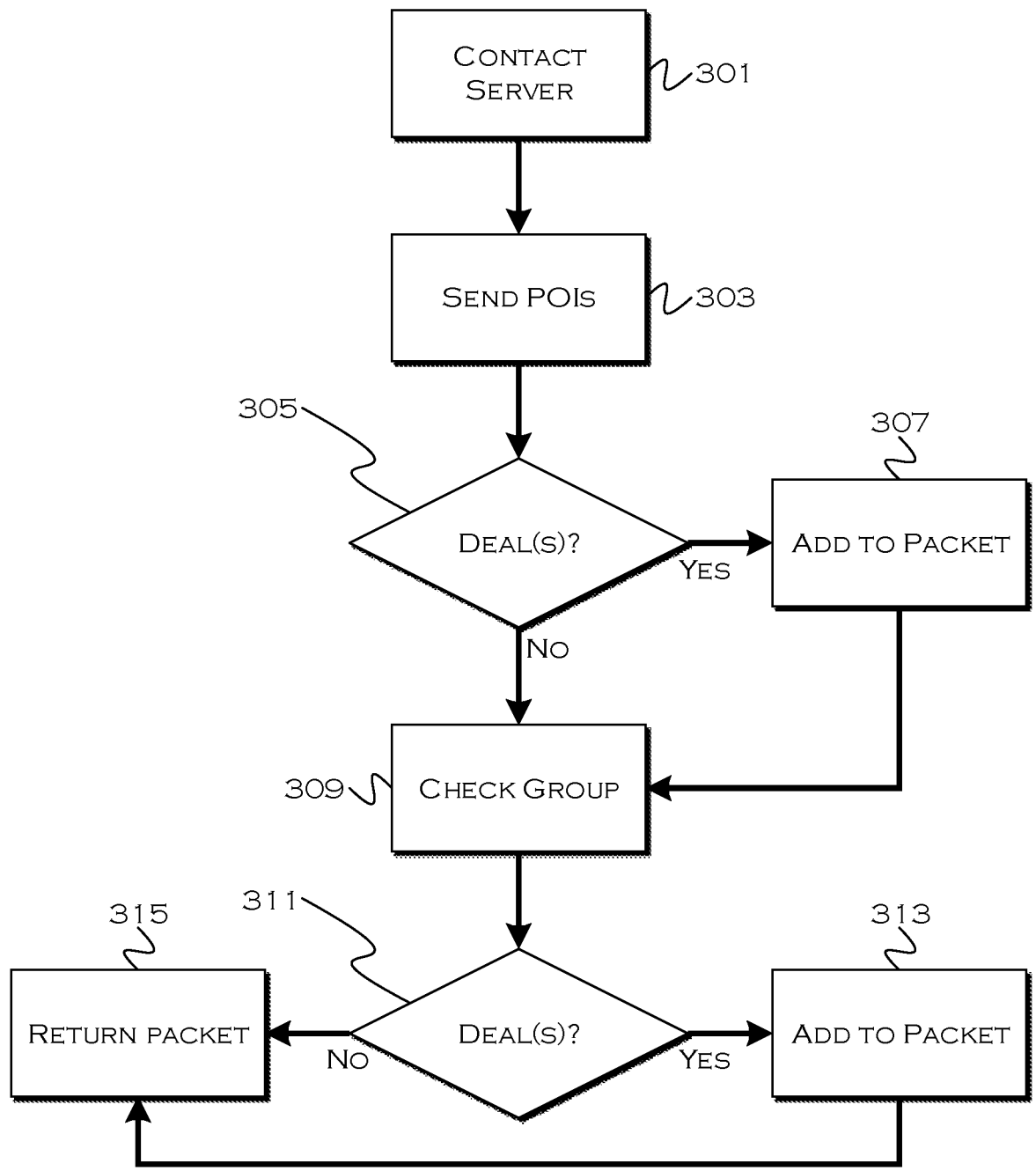
FIG. 3 shows an illustrative deal-provision process.

FIG. 3 shows an illustrative deal-provision process. In this illustrative example, a system sends POI identifiers to a remote server that has access to deals associated with POIs. The deals can be populated by vendors or, for example, the deals may be identified from members of a discrete group or community. For example, the driver may have a group of like-minded individuals who all want to golf whenever fees are below a certain threshold. Since the golf courses may not advertise the deals, drivers may identify opportunities for use by their friends/group members. Then, if the deal meets a parameter specified for a given driver, the process may add this to a list of deals retrievable by the server or vehicle, so that golf courses meeting the deal parameter may be identified for a given driver, based on the identification made by that driver's group.

The process contacts 301 a server handling the deal provision, and sends 303 a list of current POIs to the server. For each POI, the server may determine 305 if a discount is currently known. If there is an available discount (or an available discount meeting a driver parameter for discounts-of-interest), the process may add 307 the deal to a packet for responding to the vehicle request. In addition to checking merchant-provided deals, the process may check 309 one or more groups to which a vehicle occupant belongs, to see if any group members have added 311 a deal which the occupant has predefined as being of interest. Again, if there are any such deals, the process adds 313 those deals to the response data packet, and then the process sends 315 the packet back with the known deals, so that the vehicle can code the POIs (if desired) and/or display the deal information.

Figure 4:
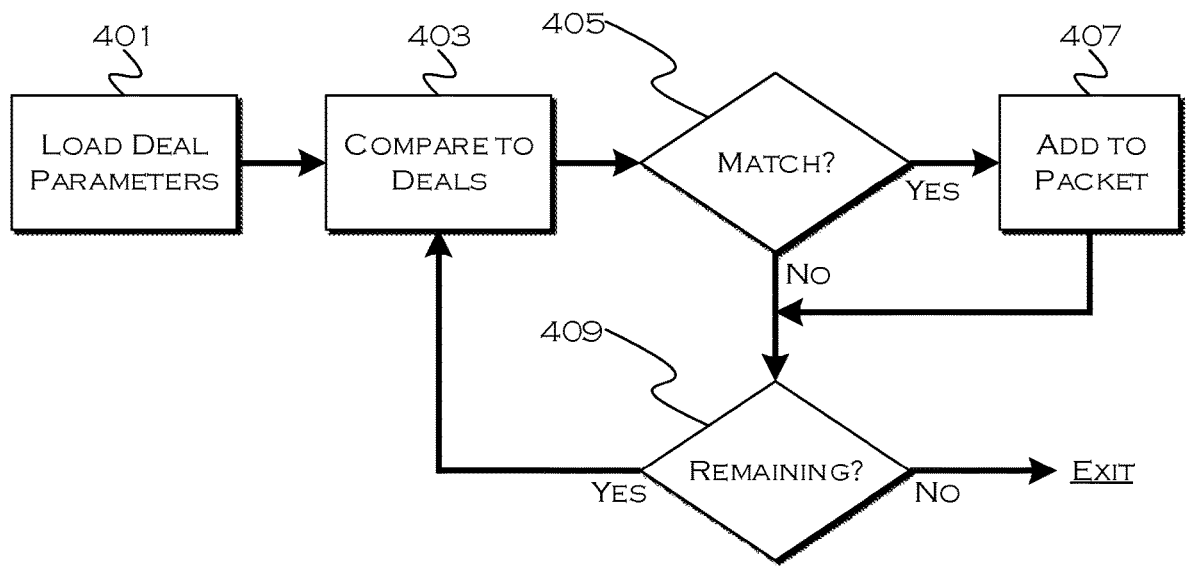
FIG. 4 shows an illustrative deal assembly process.

FIG. 4 shows an illustrative deal assembly process. This is an illustrative process that can be run to customize discount display for users. Since different users may have different parameters to which those users respond, this process allows the user to specify certain deals of interest for a given POI or POI vendor/type.

For example, a user may want to know when a restaurant is having a 25% off lunch deal, but may not be interested in traveling to certain restaurants otherwise. In that instance, the user could specify that between the hours of 11 AM and 1 PM, restaurants of X type or brand should be displayed, within 2 miles of a vehicle. If a restaurant is offering at least 25% off, then restaurants within 8 miles of the vehicle should be displayed. Thus, one set of parameters (distance) can be tied to another set of parameters (deal value) for further customization.

Following the above example, if at 11:01 AM, there are no deals, all restaurants of X type within 2 miles of the vehicle may be displayed. Then, noticing a light lunch crowd, a restaurant 5 miles from the vehicle may begin to offer a 35% off deal in order to attract customers. The system can update the vehicle with the new deal information, especially if the remote deal-system saves the current parameters for a set of vehicles or a given vehicle. Now, the restaurant that is 5 miles away but 35% off may be displayed.

If the user selects one of the restaurant POIs to be added as a waypoint, the process may remove the other restaurants. But, even in this case, the new deal restaurant may still be displayed, if the user has not yet arrived at the selected restaurant, in case the user wants to take advantage of the new deal. Once the user has parked/stopped at the selected restaurant, and/or once sufficient time has passed or the doors have cycled open and closed, the process may forego displaying any restaurant of any type until the following day at 11:00 AM.

In this example, the process loads 401 parameters associated with a known vehicle occupant. The process may compare 403 these parameters, which may specify deals of interest, among other things, to see if there is a match 405. If there is a match with any offered deals related to any displayable points of interest (e.g., a deal plus a maximum associated range), the process may add 407 that deal to the packet. The process continues comparing and adding deals to the response packet until no POIs remain 409. Further, with regards to this process, the processor could re-run the process for a specific POI, if the vehicle was still within a maximum range for a newly issued deal. This would result in the processor returning a new data point, which the vehicle could display.

Figure 5:
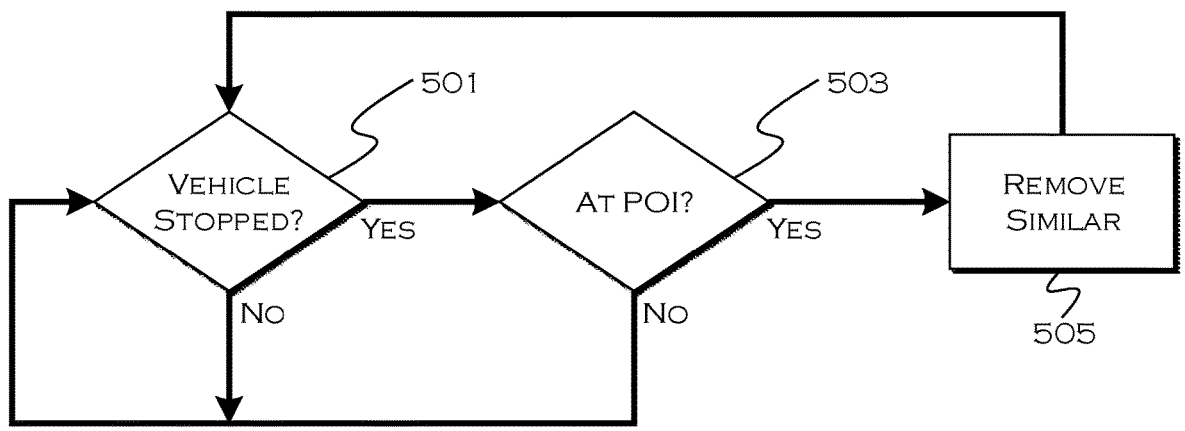
FIG. 5 shows an illustrative POI update process.

FIG. 5 shows an illustrative POI update process. In this illustrative example, the process determines 501 that a vehicle has stopped. Alternative considerations could include time, door state cycling (open/close), vehicle being placed in park, etc. If the vehicle meets a consideration for determining that a vehicle is utilizing the service (in this case stopped) at an identified POI 503, then the process may remove 505 POIs having similar characteristics. This allows the user to keep the map decluttered, and will hopefully avoid redundant stops for a service which was already obtained.

The illustrative embodiments allow for dynamic, automatic presentation of POIs based on user parameters defining conditions for POI presentation. The conditions may be inter-dependent, and users can see a map populated with relevant POIs while the user travels. Since the updating may be dynamic and ongoing, users may also see points that have become temporarily irrelevant (because the user already took advantage of the service) removed from a display.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined in logical manners to produce situationally suitable variations of embodiments described herein.

What is claimed is:

1. A system comprising:
   a processor configured to:
   load predefined point of interest (POI) parameters, defining when a POI should be displayed and associated with the POI, from a user profile associated with a known vehicle occupant;
   examine an upcoming navigation route;
   populate a navigation route display with POIs identified by the parameters, based on the parameters associated with a given POI being met by a present set of conditions;
   determine that a predefined event indicating a stop at one of the POIs has occurred; and
   removing the at least a subset of the plurality of POIs when the present set of conditions set no longer correlates to a parameter associated with POIs in the subset, including at least removing all POIs having a same type, based on an type-identifier as a parameter associated with the POIs, as the POI at which the stop was made.

2. The system of claim 1, wherein the navigation route display includes an entire route to a destination.

3. The system of claim 1, wherein the navigation route display includes a predefined locality around a current vehicle location.

4. The system of claim 3, wherein the predefined locality varies for each of a plurality of POIs, such that a first POI is displayed based on being in a first proximity associated with the first POI, and a second POI is displayed based on being in a second proximity, different from the first proximity, associated with a second POI.

5. The system of claim 1, wherein the processor is configured to determine, for each displayed POI, whether the POI is offering a discount and to visually code any displayed POI offering a discount in a manner different from displayed POIs not offering a discount.

6. The system of claim 1, wherein the processor is configured to:
   determine if a driver selects the POI; and
   responsive to the driver selecting the POI, display additional information about the POI.

7. The system of claim 6, wherein the selection is based on the driver touching the POI.

8. The system of claim 6, wherein the selection is based on the driver verbally instructing POI selection.

9. The system of claim 6, wherein the additional information includes displaying a discount associated with the POI.

10. The system of claim 6, wherein the additional information includes displaying merchant information associated with the POI.

11. The system of claim 6, wherein the additional information includes an option to add the POI as a waypoint along the route.

12. The system of claim 6, wherein the processor is configured to remove additional POIs having a shared characteristic with a selected POI that is also added as a waypoint.

13. The system of claim 12, wherein the shared characteristic includes a brand name.

14. The system of claim 12, wherein the shared characteristic includes a type of good or service sold at the selected POI.

15. A computer-implemented method comprising:
   accessing a set of point of interest (POI) parameters associated with an identified vehicle occupant;
   determining a correlation between a parameter set, associated with a type of POI, and a current condition set, based on predefined parameter values;
   displaying a plurality of the POIs of the type, in conjunction with a displayed route, responsive to the correlation;
   determining that a predefined event indicating a stop at one of the POIs of the type has occurred; and
   removing the plurality of POIs when the condition set no longer correlates to the predefined parameter values, including at least removing all POIs having a same type, based on an identifier associated with the POIs, as the POI at which the stop was made.

16. The method of claim 15, wherein the removing further comprises removing all POIs having a same brand as the POI at which the stop was made.

17. The system of claim 15, wherein the parameters include time-based parameters.

18. The system of claim 15, wherein the parameters include environmental parameters.

* * * * *